(12) United States Patent
Kim et al.

(10) Patent No.: US 10,886,598 B2
(45) Date of Patent: Jan. 5, 2021

(54) ANTENNA MODULE AND ELECTRONIC DEVICE HAVING THE SAME

(71) Applicant: WITS Co., Ltd., Yongin-si (KR)

(72) Inventors: Hee Seung Kim, Suwon-si (KR); Ki Won Chang, Suwon-si (KR); Jae Sun Won, Suwon-si (KR); Chang Hee Lee, Suwon-si (KR); Hyo Jung Yoon, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 589 days.

(21) Appl. No.: 15/720,815

(22) Filed: Sep. 29, 2017

(65) Prior Publication Data
US 2018/0138580 A1 May 17, 2018

(30) Foreign Application Priority Data

Nov. 16, 2016 (KR) .................. 10-2016-0152944
Jan. 12, 2017 (KR) .................. 10-2017-0005585
Apr. 25, 2017 (KR) .................. 10-2017-0053019

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 7/06* (2013.01); *H01Q 9/0421* (2013.01);
(Continued)

(58) Field of Classification Search
CPC .......... H01Q 7/06; H01Q 1/243; H01Q 21/28; H01Q 9/0442; H01Q 9/42; H01Q 9/0421;
(Continued)

(56) References Cited

U.S. PATENT DOCUMENTS

2005/0007296 A1* 1/2005 Endo ................ G06K 19/07749
343/895
2009/0096694 A1* 4/2009 Ito .......................... H01Q 1/243
343/788
(Continued)

FOREIGN PATENT DOCUMENTS

CN 103053074 A 4/2013
CN 207664220 U 7/2018
(Continued)

OTHER PUBLICATIONS

Korean Office Action dated Oct. 18, 2018, in corresponding Korean Application No. 10-2017-0053019 (8 pages in English, 8 pages in Korean).
(Continued)

*Primary Examiner* — Graham P Smith
*Assistant Examiner* — Jae K Kim
(74) *Attorney, Agent, or Firm* — Harness, Dickey & Pierce, P.L.C.

(57) ABSTRACT

An antenna module includes: a coil part including an antenna wiring disposed on an insulating substrate; a first magnetic part disposed on a first surface of the insulating substrate; and a second magnetic part disposed on a second surface of the insulating substrate, wherein the first magnetic part and the second magnetic part overlap with each other on a center region of the antenna wiring.

17 Claims, 15 Drawing Sheets

(51) Int. Cl.
   *H01Q 9/04*      (2006.01)
   *H01Q 21/00*     (2006.01)
   *H01Q 9/42*      (2006.01)
   *H01Q 21/28*     (2006.01)
   *H01Q 7/06*      (2006.01)
   *H04B 5/00*      (2006.01)
   *H01F 17/00*     (2006.01)

(52) U.S. Cl.
   CPC ............ *H01Q 9/0442* (2013.01); *H01Q 9/42* (2013.01); *H01Q 21/28* (2013.01); *H04B 5/0081* (2013.01); *H01F 2017/0066* (2013.01); *H01Q 1/38* (2013.01); *H01Q 21/0025* (2013.01)

(58) Field of Classification Search
   CPC .... H01Q 21/0025; H01Q 1/38; H01F 7/0006; H01F 2017/0066; H04B 5/0081
   See application file for complete search history.

(56) References Cited

U.S. PATENT DOCUMENTS

| | | | | |
|---|---|---|---|---|
| 2009/0201116 | A1* | 8/2009 | Orihara | H01Q 1/38 336/200 |
| 2010/0156729 | A1* | 6/2010 | Kubo | H01Q 1/38 343/702 |
| 2010/0309081 | A1* | 12/2010 | Kobayashi | H01Q 7/06 343/788 |
| 2012/0038443 | A1* | 2/2012 | Kubo | H01Q 1/243 336/90 |
| 2012/0081257 | A1* | 4/2012 | Yosui | H01Q 7/08 343/788 |
| 2013/0113662 | A1* | 5/2013 | Kato | H01P 11/00 343/702 |
| 2013/0147675 | A1 | 6/2013 | Kato et al. | |
| 2014/0191916 | A1 | 7/2014 | Ito | |
| 2014/0198006 | A1* | 7/2014 | Nakano | G06K 7/10178 343/788 |
| 2014/0218261 | A1* | 8/2014 | Ito | H01Q 7/06 343/866 |
| 2014/0266546 | A1* | 9/2014 | Mao | H01F 41/046 336/200 |
| 2016/0042846 | A1* | 2/2016 | Wang | H01F 1/0302 336/200 |
| 2016/0261046 | A1* | 9/2016 | Seigenji | H01Q 7/08 |
| 2017/0141668 | A1* | 5/2017 | Xing | H02K 7/1876 |

FOREIGN PATENT DOCUMENTS

| | | |
|---|---|---|
| JP | 2002324221 A | 11/2002 |
| JP | 2005184094 A | 7/2005 |
| JP | 2012-60626 A | 3/2012 |
| JP | 5641152 B2 | 12/2014 |
| JP | 2015-32840 A | 2/2015 |
| KR | 10-2014-0102617 A | 8/2014 |
| WO | WO 2012/050037 A1 | 4/2012 |

OTHER PUBLICATIONS

Chinese Office Action dated Apr. 24, 2020 issued in corresponding Chinese Patent Application No. 201711128400.0.

* cited by examiner

ANTENNA MODULE AND ELECTRONIC DEVICE HAVING THE SAME

CROSS-REFERENCE TO RELATED APPLICATIONS

This application claims benefit under 35 U.S.C. § 119(a) of Korean Patent Application Nos. 10-2016-0152944, 10-2017-0005585, and 10-2017-0053019 filed on Nov. 16, 2016, Jan. 12, 2017, and Apr. 25, 2017, respectively, in the Korean Intellectual Property Office, the entire disclosures of which are incorporated herein by reference for all purposes.

BACKGROUND

1. Field

The following description relates to an antenna module and an electronic device including an antenna module.

2. Description of Related Art

As portable terminals such as smartphones become common and functions thereof are improved, a payment method for such portable terminals using short-range communications is emerging. However, since a data transmission channel is not present between a point of sale (POS) terminal, conventionally and commonly installed in a store, and smartphones, payments using smartphones have many obstacles. In order to overcome such obstacles, methods using a two-dimensional (2D) barcode or near field communication (NFC) are proposed.

However, since such a payment means using a 2D barcode or NFC does not have a reading apparatus suitable for a POS terminal, it may be difficult to commonly apply the payment means, and in particular, in a case of NFC, there are disadvantages in that NFC performance standardized in many smartphones may be lacking, and a separate apparatus for reading the NFC should be included.

Therefore, methods capable of performing payments with the portable terminal while using a POS terminal which is generally used in an existing store or the like are proposed. In particular, a magnetic secure transmission (MST) method capable of performing payment without adding a separate reading apparatus to a POS terminal has recently been proposed.

Since such a magnetic secure transmission method aims at payments using smartphones, it is finally installed in the smartphone. Therefore, an antenna module capable of efficiently communicating with POS terminals is required in smartphones.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes: a coil part including an antenna wiring disposed on an insulating substrate; a first magnetic part disposed on a first surface of the insulating substrate; and a second magnetic part disposed on a second surface of the insulating substrate, wherein the first magnetic part and the second magnetic part overlap with each other on a center region of the antenna wiring.

The antenna wiring may include a first pattern disposed on the first surface of the insulating substrate, a second pattern disposed on the second surface of the insulating substrate, and interlayer connecting conductors disposed in the insulating substrate and connecting the first pattern and the second pattern to each other.

The first pattern may include first linear patterns exposed to an exterior of the first magnetic part and disposed in parallel. The second pattern may include second linear patterns exposed to the exterior of the second magnetic part and disposed in parallel.

The first magnetic part and the second pattern may face each other. The second magnetic part and the first pattern may face each other. The insulating substrate may be interposed between the first magnetic part and the second pattern. The insulating substrate may be interposed between the second magnetic part and the first pattern.

A region of the insulating substrate on which the first magnetic part is disposed and a region of the insulating substrate on which the second magnetic part is disposed may be separated by the interlayer connecting conductors and the center region.

The first magnetic part may include a first magnetic flux connecting part disposed in the center region, and a first body part extended from the first magnetic flux connecting part and facing the second pattern. The second magnetic part may include a second magnetic flux connecting part disposed in the center region, and a second body part extended from the second magnetic flux connecting part and facing the first pattern.

The second body part may have an area greater than an area of the first body part.

The antenna wiring may be formed in a quadrangular shape as a whole. The interlayer connecting conductors may be disposed at corners at which the antenna wiring is bent.

The first magnetic flux connecting part and the second magnetic flux connecting part may each be formed in the quadrangular shape. The first body part may include a first body portion extended from a first side of the first magnetic flux connecting part, and a second body portion extended from a second side of the first magnetic flux connecting part connected to the first side of the first magnetic flux connecting part. The second body part may include a third body portion extended from a first side of the second magnetic flux connecting part, and a fourth body portion extended from a second side of the second magnetic flux connecting part connected to the first side of the second magnetic flux connecting part.

The first magnetic part or the second magnetic part may have a thickness that is the same as a thickness of the antenna wiring.

The antenna module may further include a third magnetic part disposed on the first surface of the insulating substrate. The antenna wiring may include a first antenna wiring and a second antenna wiring spaced apart from each other. The first antenna wiring may be disposed between the first magnetic part and the second magnetic part. The second antenna wiring may be disposed between the third magnetic part and the second magnetic part.

The second magnetic part may include a first side overlapping the first magnetic part, and a second side overlapping the third magnetic part.

A through-hole may be formed in the insulating substrate in the center region. The first magnetic part and the second magnetic part may each include an inserting part inserted into the through-hole.

In another general aspect, an antenna module includes: interlayer connecting conductors disposed in an insulating substrate; a first pattern disposed on a first surface of the insulating substrate; and a second pattern disposed on a second surface of the insulating substrate and disposed so as not to overlay the first pattern, wherein the first pattern and the second pattern are connected by the interlayer connecting conductors to form an antenna wiring having a spiral shape.

In another general aspect, an electronic device includes: an antenna module including a coil part including an antenna wiring disposed on an insulating substrate, a first magnetic part disposed on a first surface of the coil part, and a second magnetic part disposed on a second surface of the coil part and overlaying the first magnetic part only in a center region of the antenna wiring; and a case accommodating the antenna module, wherein the case includes a rear cover formed of a metal material and a side cover formed of a non-metal material.

The first magnetic part and the second magnetic part may include sides facing the side cover.

The second magnetic part may overlay the first magnetic part only in the center region.

The electronic device may be any one of a cellular phone, a tablet PC, a notebook PC, and a smartwatch.

The antenna module may be configured to form a magnetic field outside of the electronic device through the side cover.

The antenna wiring may include a first pattern disposed on a first surface of the insulating substrate, a second pattern disposed on a second surface of the insulating substrate that is disposed opposite to the first surface of the insulating substrate, and conductors extending through the insulating substrate and connecting the first pattern to the second pattern.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
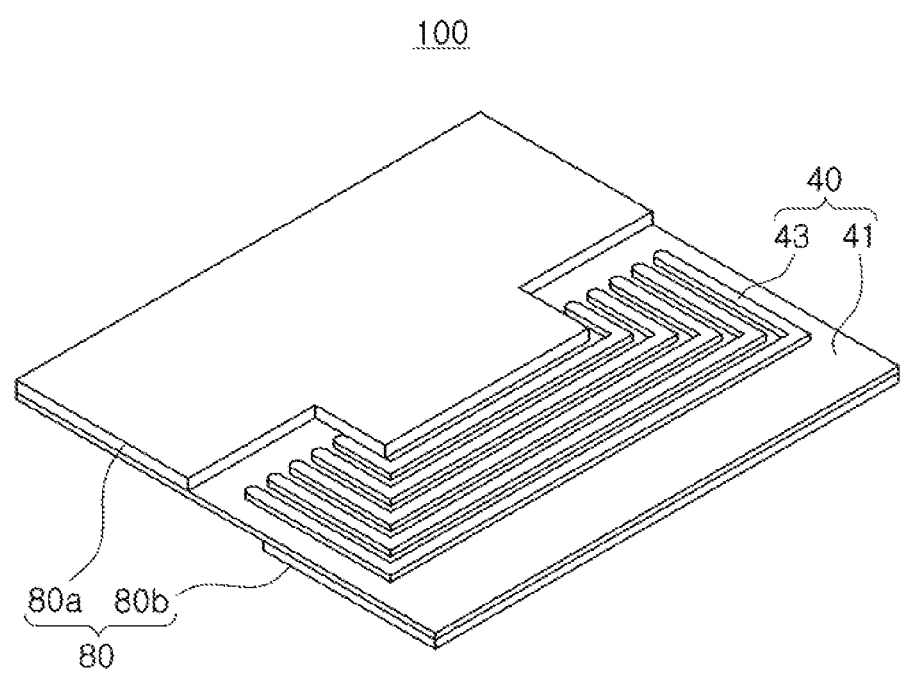
FIG. 1 is a perspective view schematically illustrating an antenna module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, example embodiments will be described in detail with reference to the accompanying drawings.

Figure 2:
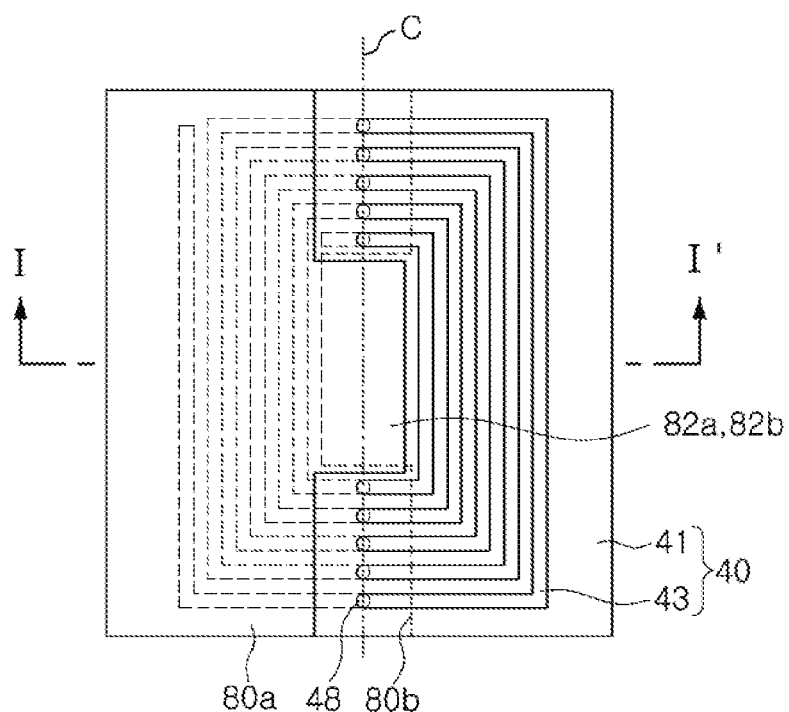
FIG. 2 is a plan view of the antenna module illustrated in FIG. 1.
Figure 3:
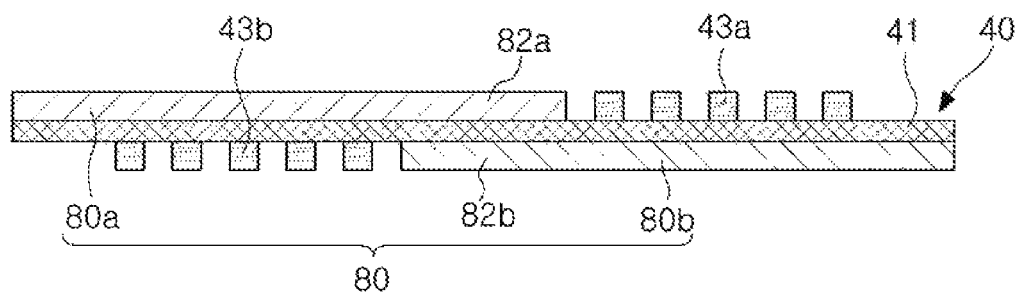
FIG. 3 is a cross-sectional view taken along line I-I' of FIG. 2.
Figure 4:
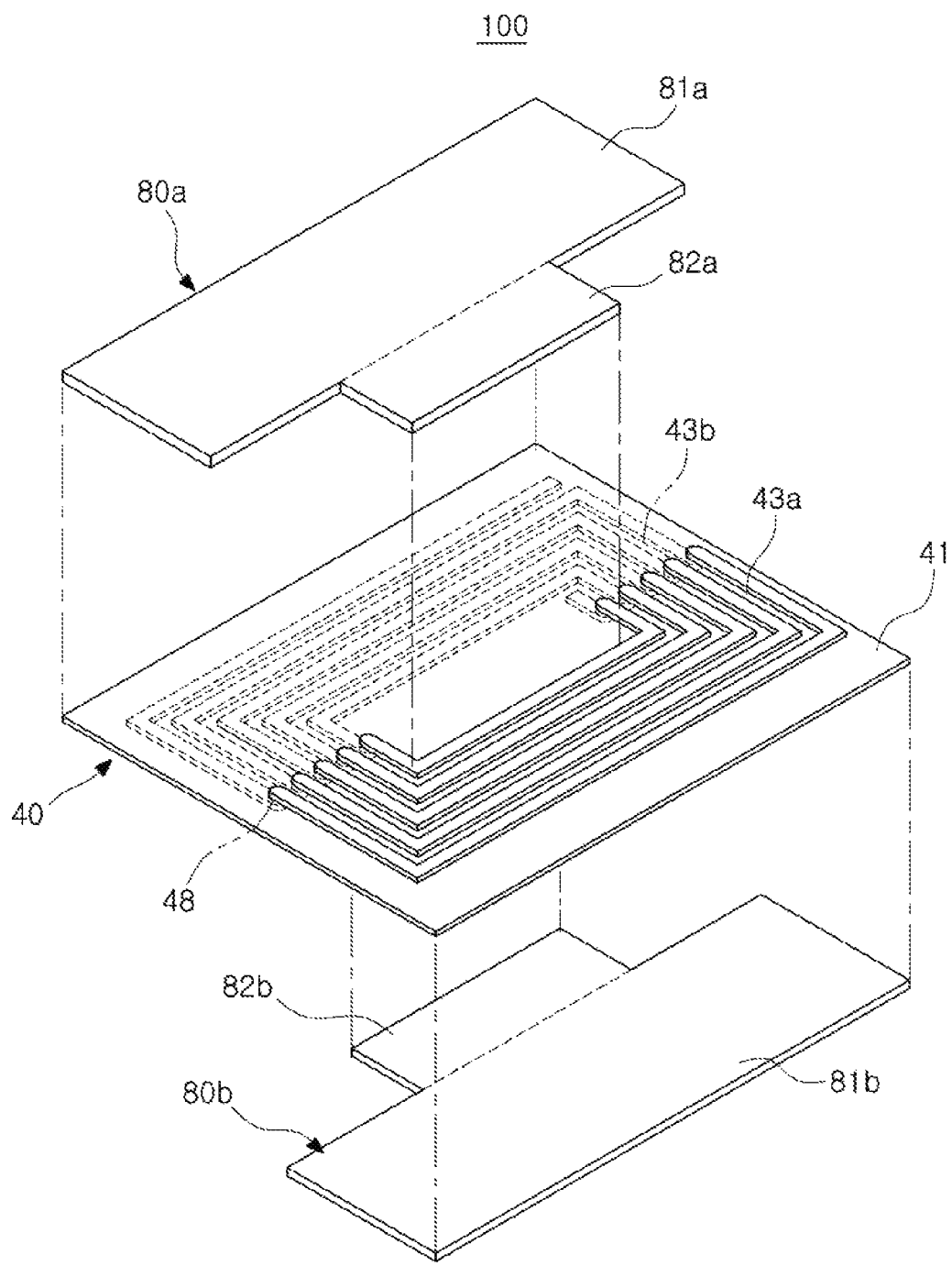
FIG. 4 is an exploded perspective view of the antenna module illustrated in FIG. 1.

FIG. 1 is a perspective view schematically illustrating an antenna module 100, according to an embodiment. FIG. 2 is a plan view of the antenna module 100. FIG. 3 is a cross-sectional view taken along line I-I' of FIG. 2. In addition, FIG. 4 is an exploded perspective view of the antenna module 100.

Referring to FIGS. 1 through 4, an antenna module 100 includes a coil part 40 and a magnetic part 80.

The coil part 40 is formed of a substrate. In more detail, the coil part 40 includes an insulating substrate 41, and an antenna wiring 43 formed on at least one surface of the insulating substrate 41.

The insulating substrate 41 is a substrate in which a circuit wiring is formed on one surface or opposing surfaces thereof. For example, an insulating film (e.g., a polyimide film) is used for the insulating substrate 41. In such an example, the coil part 40 is a flexible printed circuit board (PCB). However, the coil part 40 is not limited to the flexible PCB, but various kinds of substrates (e.g., a printed circuit board, a ceramic substrate, a glass substrate, an epoxy substrate, a flexible substrate, and the like) which are well known in the art may be selectively used as long as the circuit wiring is formed on the opposite surfaces thereof.

For example, the antenna wiring 43 is disposed on opposite surfaces of the insulating substrate 41.

The antenna wiring 43 may be in a form of a circuit wiring formed of a copper foil.

The antenna wiring 43 may be manufactured by patterning double sided copper clad laminates (CCL). In addition, the insulating substrate 41 may be a flexible PCB (FPCB) film having a double-sided structure, and the antenna wiring 43 may be formed by performing a photolithography method on the opposite surfaces of the insulating substrate 41.

Accordingly, a thickness of the coil part 40 according to the example described above may be very thin. However, the antenna wiring 43 may be manufactured in a multilayer substrate, or may also be manufactured in a form of the printed circuit board (PCB) having rigidity, as needed.

The antenna wiring 43 is, for example, a wiring having a spiral shape. In more detail, referring to FIGS. 2 and 3, the antenna wiring 43 includes a first pattern 43a disposed on a first surface of the insulating substrate 41, a second pattern 43b disposed on a second surface of the insulating substrate 41, which is an opposite surface of the first surface, and interlayer connecting conductors 48 connecting the first pattern 43a and the second pattern 43b. The interlayer connecting conductors 48 are disposed in the insulating substrate 41 so as to penetrate through the insulating substrate 41, and electrically connect the first pattern 43a and the second pattern 43b to each other.

Referring to FIG. 2, when the insulating substrate 41 is divided, based on a dividing line C of FIG. 2, the first pattern 43a is disposed on one side of the dividing line C and the second pattern 43b is disposed on the other side of the dividing line C of the insulating substrate 41. In addition, the interlayer connecting conductors 48 are disposed along the dividing line C. Therefore, a position of the dividing line C is defined by the positions of the interlayer connecting conductors 48.

In addition, a continuous spiral shape of the antenna wiring 43 is completed by the first pattern 43a, the second pattern 43b, and the interlayer connecting conductors 48. In addition, the antenna wiring 43 is alternately disposed on the first surface and the second surface of the insulating substrate 41.

The first pattern 43a and the second pattern 43b each include linear patterns that are disposed in parallel. The linear patterns may be disposed to have concentricity.

The linear patterns of the first pattern 43a are connected to the linear patterns of the second pattern 43b through the interlayer connecting conductors 48 at opposite ends thereof, respectively. Therefore, any one of the linear patterns of the first pattern 43a is connected to any one of the linear patterns of the second pattern 43b through an interlayer connecting conductor 48 to form a single coil turn.

By the antenna structure described above, half (or, a first portion) of the antenna wiring 43 based on the dividing line C is disposed on the first surface of the insulating substrate 41, and the remaining half (or, remaining portion) of the antenna wiring may be disposed on the second surface of the insulating substrate 41.

In addition, as shown in FIG. 3, the antenna wiring 43 protrudes from the insulating substrate 41 to the exterior thereof, rather than being embedded in the insulating substrate 41. In this example, a distance, or height, by which the antenna wiring 43 protrudes from the substrate 41 in a thickness direction of the substrate may be similar to or the same as a thickness of a magnetic part 80 to be described below.

An overall contour of the antenna wiring 43 is an annular shape (or a ring shape). Therefore, a region (hereinafter, a center region) in which the antenna wiring 43 is not formed is disposed in the center of the antenna wiring 43. That is, the center region is an inner region of the antenna wiring 43.

The antenna wiring 43 may be formed of a single line coil, or may be formed of a coil of a Litz wire form including several strands.

The antenna wiring 43 configured as described above may be used as a magnetic secure transmission (MST) antenna. However, the antenna wiring 43 is not limited to an MST antenna.

The magnetic part 80 is used as a magnetic path of a magnetic field generated by the antenna wiring 43 of the coil part 40, and is provided to efficiently form the magnetic path of the magnetic field. To this end, the magnetic part 80 is formed of a material capable of easily forming the magnetic path. For example, the magnetic part 80 is formed of a material having permeability such as a ferrite, a silicon steel plate, a nanocrystal magnetic material, or an amorphous magnetic material.

The magnetic part 80 is formed in a flat plate shape such as a sheet, and is stacked on opposite surfaces of the coil part 40. As described above, a thickness of the magnetic part 80 may be similar to or the same as a height of the antenna wiring 43. Thereby, a surface of the magnetic part 80 and a surface of the antenna wiring 43 may be disposed on approximately the same plane.

The magnetic part 80 includes a first magnetic part 80*a* disposed on the first surface of the insulating substrate 41, and a second magnetic part 80*b* disposed on the second surface of the insulating substrate 41. Therefore, the coil part 40 has a form in which the coil part 40 is interposed between the first magnetic part 80*a* and the second magnetic part 80*b*.

In addition, the first magnetic part 80*a* and the second magnetic part 80*b* are stacked on the insulating substrate 41, and are respectively disposed on regions on which the antenna wiring 43 is not present.

In more detail, the first magnetic part 80*a* and the first pattern 43*a* are disposed on the first surface of the insulating substrate 41, and the first magnetic part 80*a* is disposed on a region in which the first pattern 43*a* is not formed, so as not to overlap the first pattern 43*a*.

Similarly, the second magnetic part 80*b* and the second pattern 43*b* are disposed on the second surface of the insulating substrate 41, and the second magnetic part 80*b* is disposed on a region in which the second pattern 43*b* is not formed, so as not to overlap the second pattern 43*b*.

Accordingly, the first magnetic part 80*a* faces the second pattern 43*b* while having the insulating substrate 41 interposed between the first magnetic part 80*a* and the second pattern 43*b*, and the second magnetic part 80*b* faces the first pattern 43*a* while having the insulating substrate 41 interposed between the second magnetic part 80*b* and the first pattern 43*a*.

Referring also to FIG. 4, the first magnetic part 80*a* and a second magnetic part 80*b* are respectively divided into first and second body parts 81*a* and 81*b* facing the antenna wiring 43, and first and second magnetic flux connecting parts 82*a* and 82*b* disposed in the center region of the antenna wiring 43.

The first and second magnetic flux connecting parts 82*a* and 82*b* of the first magnetic part 80*a* and the second magnetic part 80*b* are disposed in the center region of the antenna wiring 43. Therefore, the magnetic flux connecting part 82*a* and the magnetic flux connecting part 82*b* face each other while having the insulating substrate 41 interposed therebetween.

According an embodiment, the center region of the antenna wiring 43 has a quadrangular shape. Therefore, the first and second magnetic flux connecting parts 82*a* and 82*b* are also formed in a quadrangular shape corresponding to the shape of the center region.

In addition, the first and second magnetic flux connecting parts 82*a* and 82*b* have the same area as the center region.

However, the first and second magnetic flux connecting parts 82*a* and 82*b* are not limited to having the same area as the center region, and may also have an area which is greater or smaller than the area of the center region.

In a case in which the first and second magnetic flux connecting parts 82*a* and 82*b* are omitted, magnetic flux resistance between the first magnetic part 80*a* and the second magnetic part 80*b* is significantly increased. Therefore, efficiency of the antenna module 100 is decreased in such a case.

However, in a case in which the magnetic part 80 includes the first and second magnetic flux connecting parts 82*a* and 82*b*, as described in the embodiments disclosed herein, the first magnetic part 80*a* and the second magnetic part 80*b* provide a magnetic path that significantly decreases the magnetic flux resistance through the first and second magnetic flux connecting parts 82*a* and 82*b*. Therefore, the efficiency of the antenna module 100 is significantly increased.

According to an embodiment, the first and second body parts 81*a* and 81*b* of the first magnetic part 80*a* and the second magnetic part 80*b* are respectively extended and expanded from one side of the first and second magnetic flux connecting parts 82*a* and 82*b*, respectively. However, the antenna module 100 is not limited to such a configuration, and may be modified in various ways. For example, in another embodiment, the first and second body parts 81*a* and 81*b* of the first magnetic part 80*a* and the second magnetic part 80*b* are extended from two sides of the first and second magnetic flux connecting parts 82*a* and 82*b*, respectively.

The antenna module 100 may have an adhesive member (not shown) interposed between the coil part 40 and the magnetic part 80 so that the coil part 40 and the magnetic part 80 are firmly fixed and adhered to each other.

The adhesive member is disposed between the coil part 40 and the magnetic part 80, and bonds the magnetic part 80 and the coil part 40 to each other. The adhesive member may be formed by an adhesive sheet or an adhesive tape, and may also be formed by coating the surface of the coil part 40 or the magnetic part 80 with an adhesive or a resin having adhesive properties.

In addition, the adhesive member may also have magnetic properties due to the adhesive member containing ferrite powder particles.

Since the antenna module 100 configured as described above is manufactured in a form of a flat substrate by attaching the magnetic part 80 to the opposite surfaces of the coil part 40, but a direction of the magnetic field is formed in a surface direction of the antenna module 100, the antenna module 100 may be operated in a form similar to a solenoid antenna.

Therefore, a shape or a direction of the magnetic field generated by the antenna module 100 can be adjusted in a specific direction through a change in an arrangement position of the antenna module 100 or the shape of the magnetic part 80.

In addition, since the antenna module 100 is manufactured by an operation of stacking the magnetic part 80 on the opposite surfaces of the coil part 40, the antenna module can be very easily manufactured.

In addition, since the height by which the antenna wiring 43 protrudes from the insulating substrate 41 in the thickness direction of the insulating substrate 41 and the thickness of the magnetic part 80, which is stacked on the insulating substrate 41, are configured to be similar to or the same as each other, a step portion between the coil part 40 and the magnetic part 80 is significantly decreased, and consequently, an overall thickness of the antenna module 100 is significantly decreased. In addition, since the opposite surfaces of the antenna module 100 are formed to be flat as a whole, the antenna module 100 can be easily coupled to the electronic device.

The antenna module 100 is not limited to the above-mentioned example embodiments, and may be modified in various ways.

Figure 5:
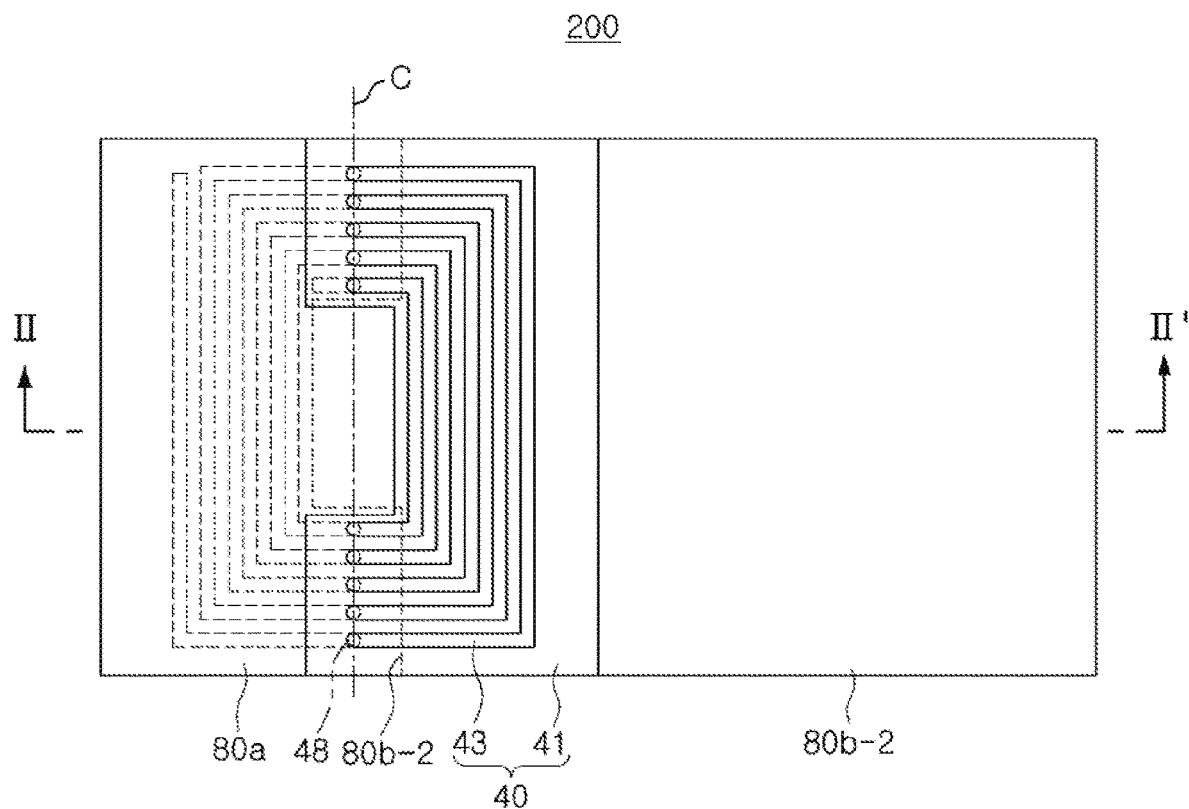
FIG. 5 is a plan view schematically illustrating an antenna module, according to another embodiment.
Figure 6:
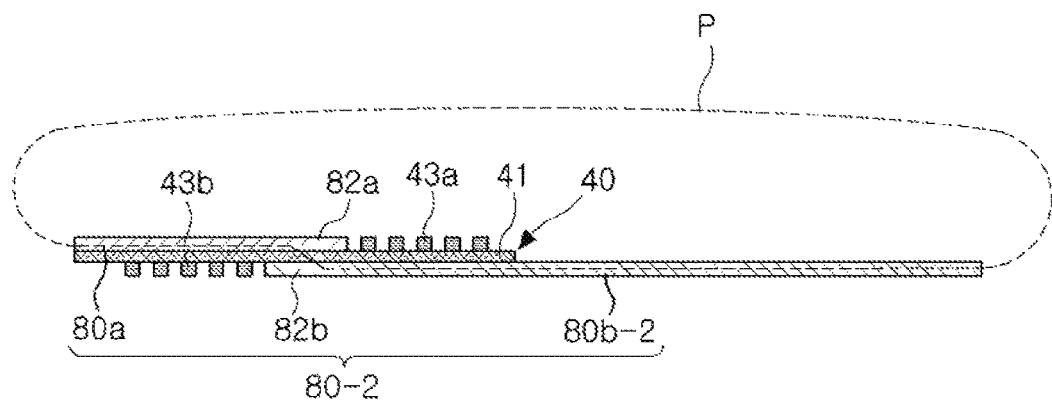
FIG. 6 is a cross-sectional view taken along line II-II' of FIG. 5.

FIG. 5 is a plan view schematically illustrating an antenna module 200, according to another embodiment. FIG. 6 is a cross-sectional view taken along line II-II' of FIG. 5. In addition, FIG. 7 is an exploded perspective view of the antenna module 200.

Figure 7:
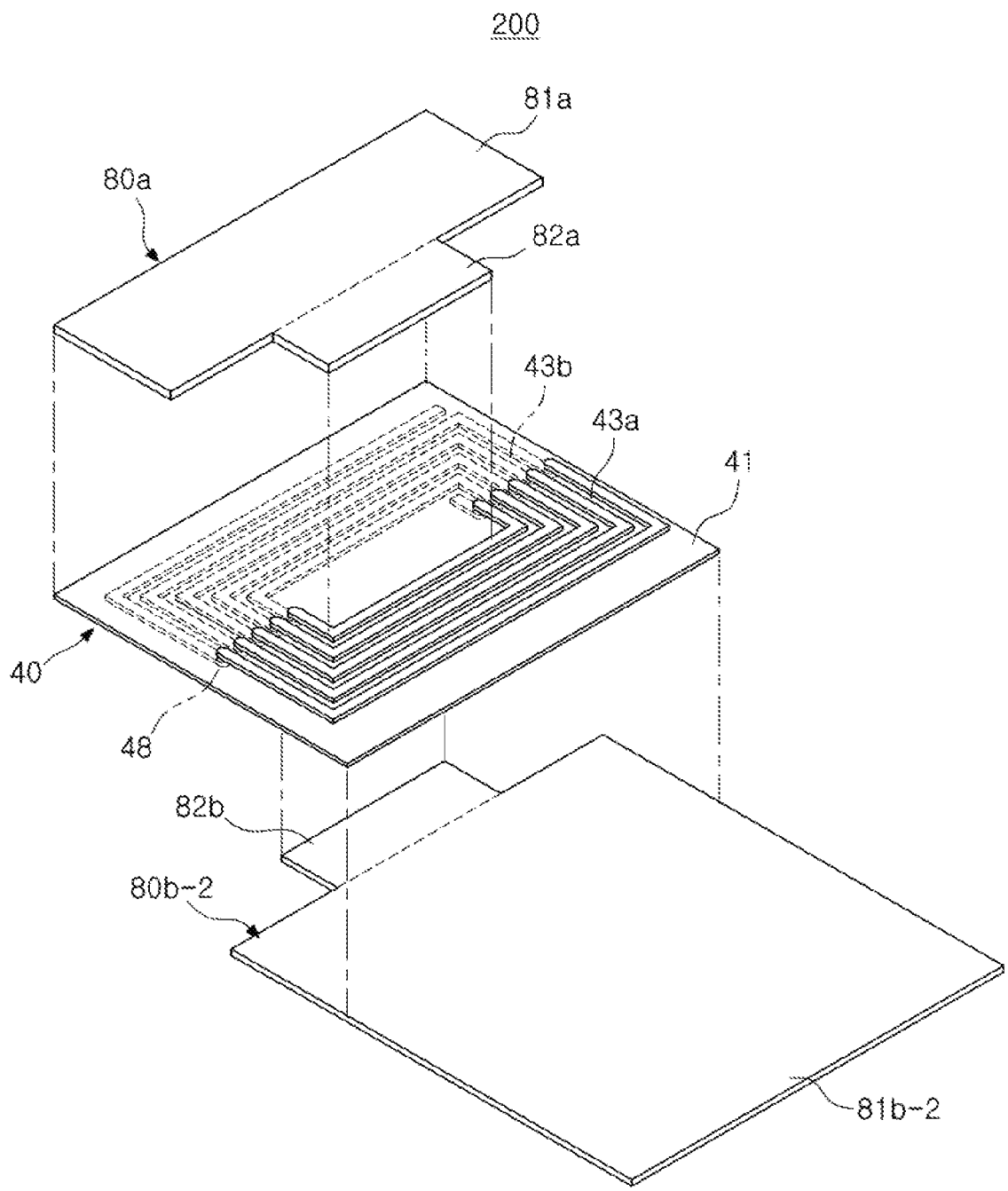
FIG. 7 is an exploded perspective view of the antenna module illustrated in FIG. 5.

Referring to FIGS. 5 through 7, the antenna module 200 includes a magnetic part 80-2 including the first magnetic part 80a and a second magnetic part 80b-2 which are formed to have different sizes. Specifically, the body part 81b-2 of the second magnetic part 80b-2 has an area greater than that of the body part 81a of the first magnetic part 80a.

As such, the size and the shape of the magnetic part 80-1 are modified with respect to the magnetic part 80 in the embodiment of FIGS. 1-4, and the magnetic field of the antenna module 200 is formed as illustrated by P in FIG. 6.

As such, an antenna module according to the disclosure may change a shape or a range of the magnetic field in various forms, and consequently, the antenna module may be utilized regardless of various shapes or sizes of a portable terminal on which the antenna module is mounted.

Figure 8:
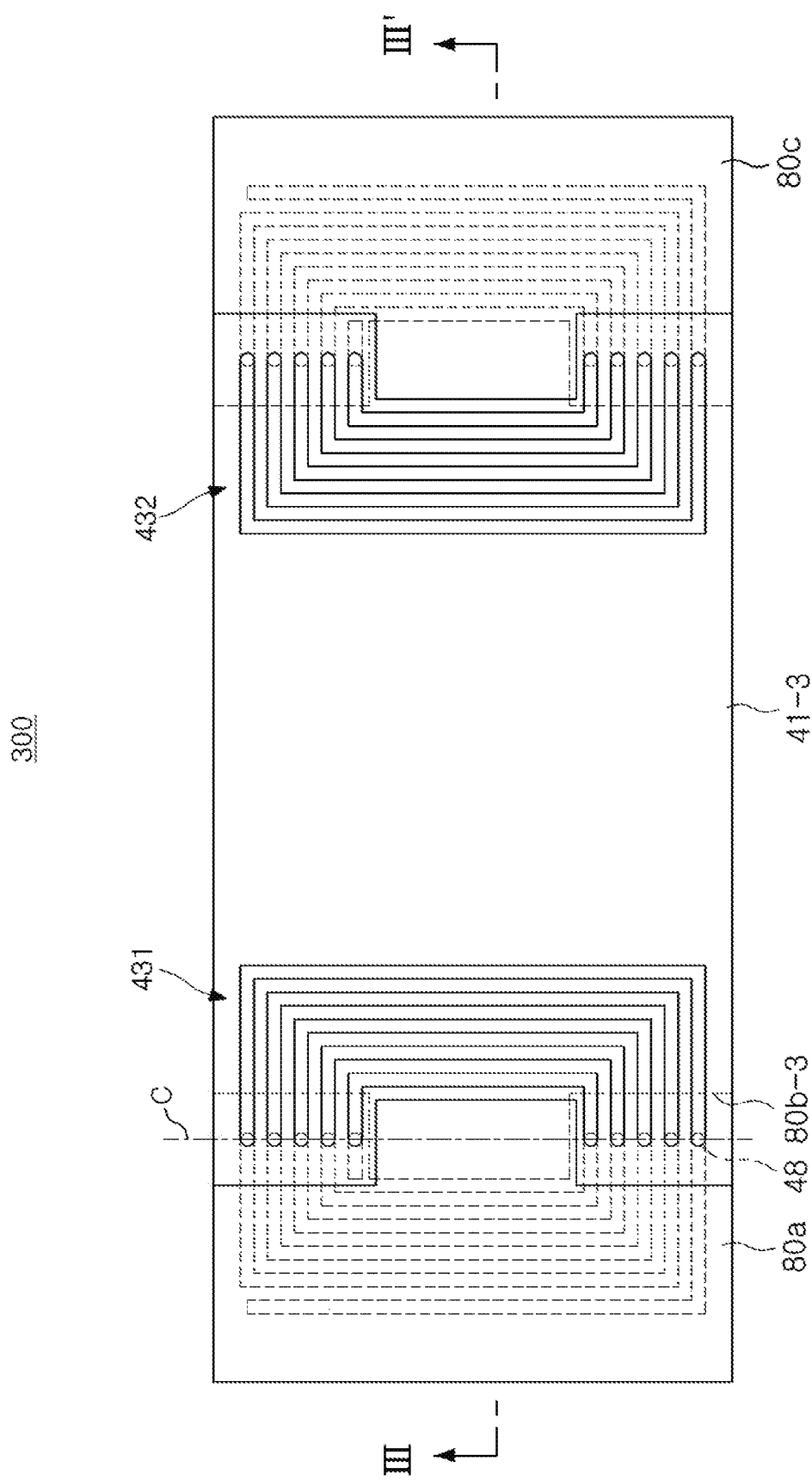
FIG. 8 is a plan view schematically illustrating an antenna module, according to another embodiment.
Figure 9:
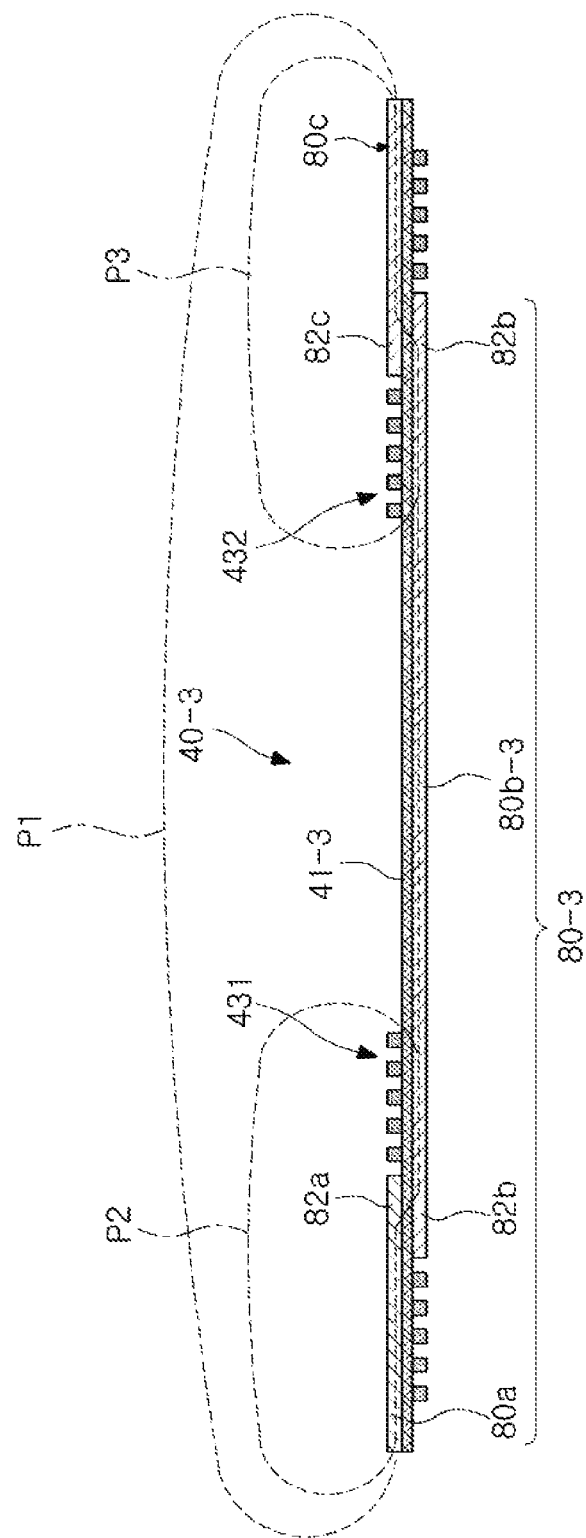
FIG. 9 is a cross-sectional view taken along line III-III' of FIG. 8.

FIG. 8 is a plan view schematically illustrating an antenna module 300, according to another embodiment. FIG. 9 is a cross-sectional view taken along line III-III' of FIG. 8. In addition, FIG. 10 is an exploded perspective view of the antenna module 300.

Figure 10:
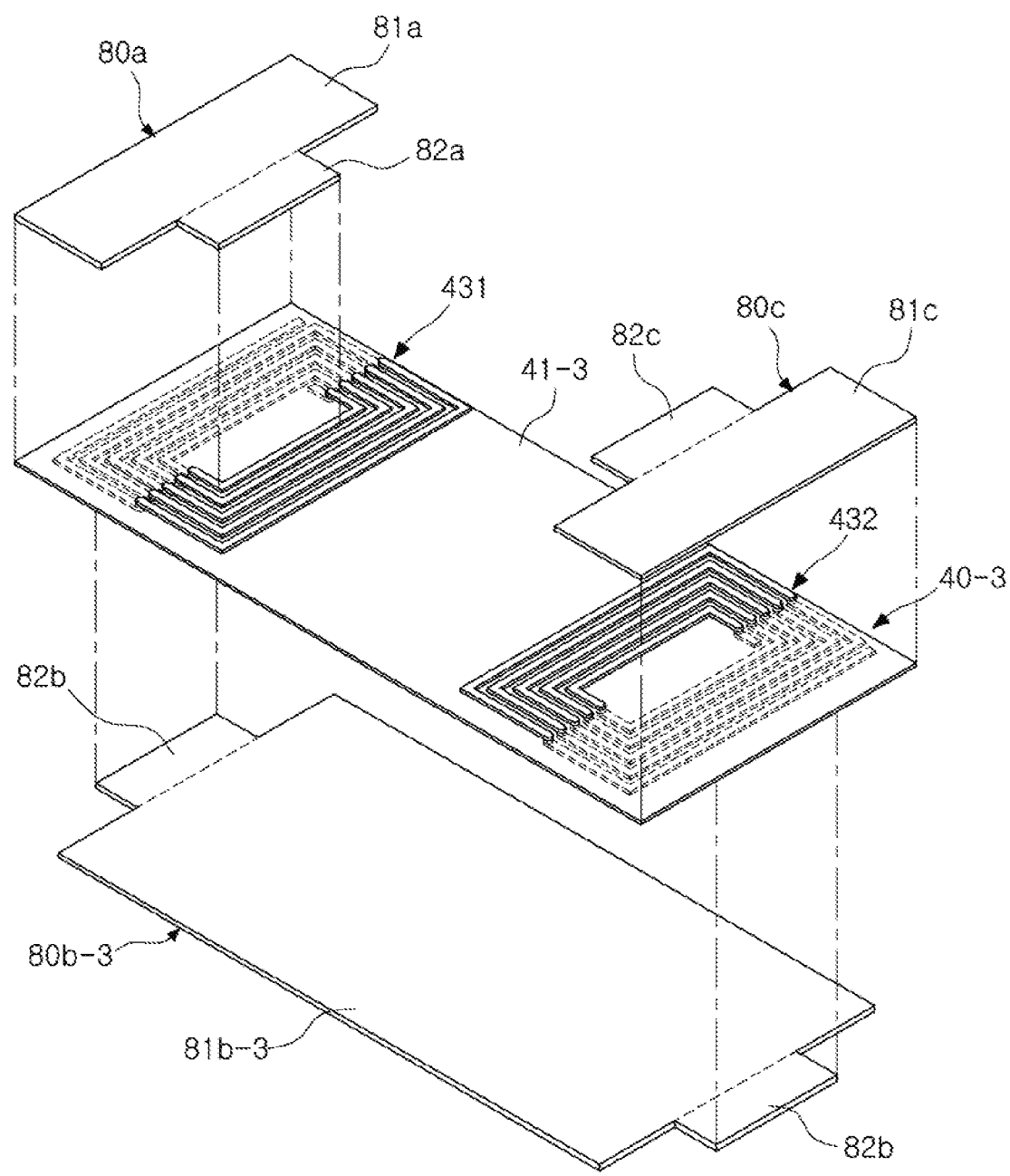
FIG. 10 is an exploded perspective view of the antenna module illustrated in FIG. 8.

Referring to FIGS. 8 through 10, the coil part 40-3 of the antenna module 300 includes first and second antenna wirings 431 and 432 that are spaced apart from each other. The first and second antenna wirings 431 and 432 may be connected to each other in series or in parallel. In addition, the first and second antenna wirings 431 and 432 are electrically separated from each other and can be operated independently of each other.

In addition, the magnetic module 300 includes a magnetic part 80-3 including the first magnetic part 80a and a third magnetic part 80c disposed on a first surface of the insulating substrate 41-3, and a second magnetic part 80b-3 disposed on a second surface of the insulating substrate 41-3.

The first magnetic part 80a faces the first antenna wiring 431, and the third magnetic part 80c faces the second antenna wiring 432. In addition, one side of the second magnetic part 80b-3 faces the first antenna wiring 431, and the other side of the second magnetic part 80b faces the second antenna wiring 432.

A portion of the coil part 40-3 in which the first antenna wiring 431 is formed is interposed between the first magnetic part 80a and the second magnetic part 80b-3, and a portion of the coil part 40-3 in which the second antenna wiring 432 is formed is interposed between the third magnetic part 80c and the second magnetic part 80b-3.

The first magnetic part 80a and the third magnetic part 80c are respectively disposed on a region of the first surface of the insulating substrate 41-3 on which the antenna wirings 431 and 432 are not disposed. In addition, the second magnetic part 80b-3 is disposed in a region of the second surface of the insulating substrate 41-3 in which the antenna wirings 431 and 432 are not disposed.

The first, second, and third magnetic flux connecting parts 82a, 82b-3, and 82c of the first magnetic part 80a, the second magnetic part 80b-3, and the third magnetic part 80c, respectively, are all disposed in the center regions of the antenna wirings 431 and 432. Therefore, the first magnetic flux connecting part 82a of the first magnetic part 80a and the second magnetic flux connecting part 82b of the second magnetic part 80b-3 face each other, and the third magnetic flux connecting part 82c of the third magnetic part 80c and the second magnetic flux connecting part 82b of the second magnetic part 80b-3 also face each other, while having the insulating substrate 41-3 interposed therebetween.

In a case in which the antenna module 300 is configured as described above, the magnetic field formed by the coil part 40-3 may be formed over the entirety of the first magnetic part 80a, the second magnetic part 80b-3, and the third magnetic part 80c, as illustrated by P1. However, the magnetic field is not limited to the magnetic field illustrated by P1. For example, magnetic fields may be formed around the first antenna wiring 431 and the second antenna wiring 432 as illustrated by P2 and P3.

As such, the antenna module 300 can be easily applied to even a case in which a plurality of antenna wirings (e.g., antenna wirings 431 and 432) are used.

Figure 11:
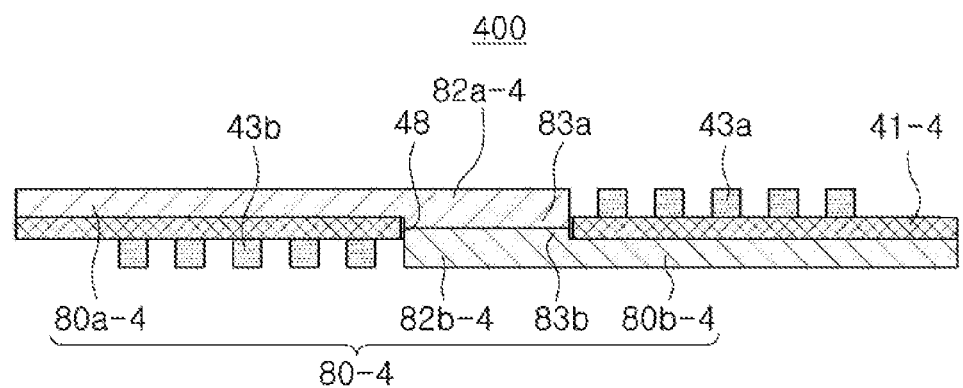
FIG. 11 is a cross-sectional view schematically illustrating an antenna module, according to another embodiment.
Figure 12:
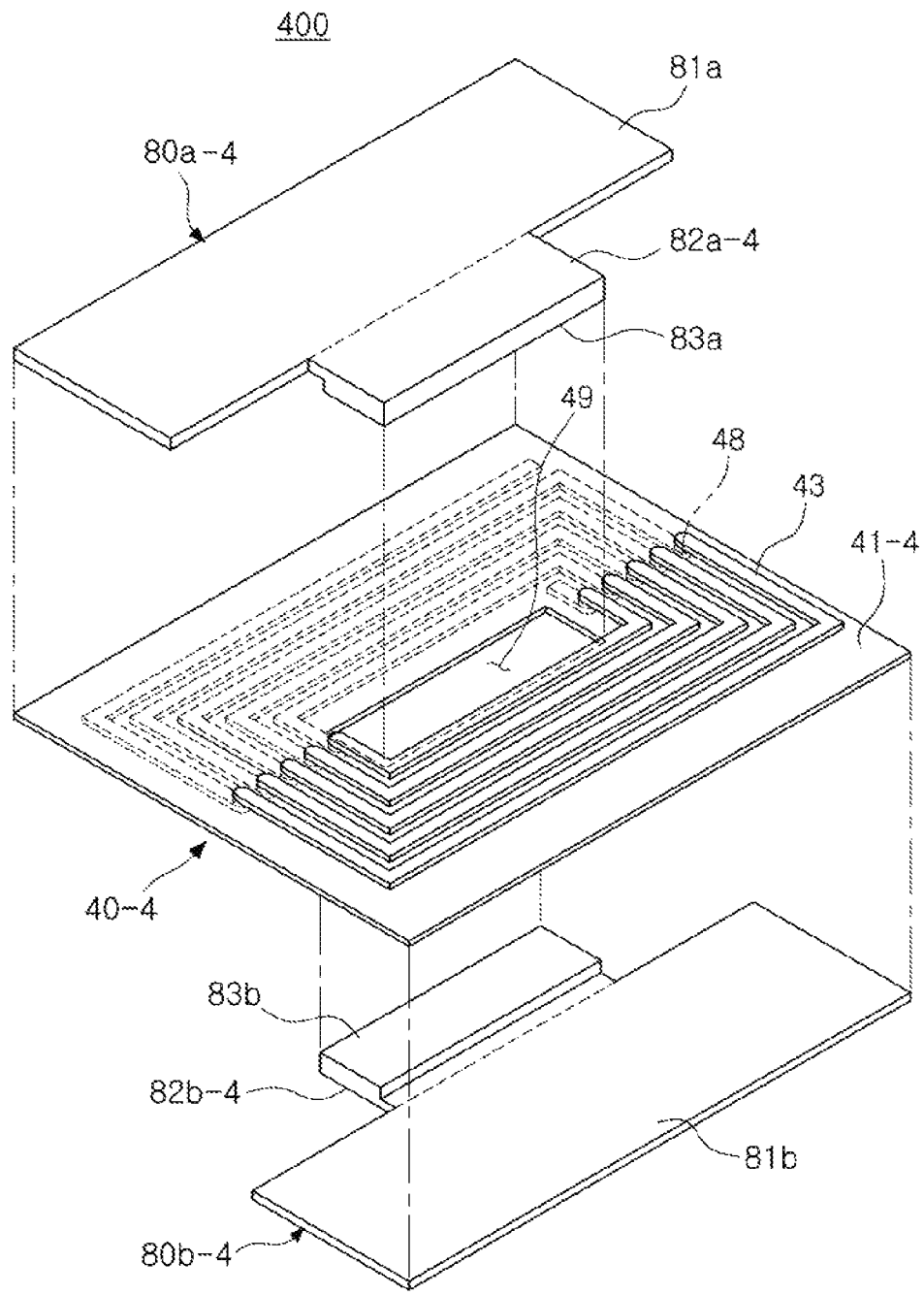
FIG. 12 is an exploded perspective view of the antenna module illustrated in FIG. 11.

FIG. 11 is a cross-sectional view schematically illustrating an antenna module 400, according to another embodiment. FIG. 12 is an exploded perspective view of the antenna module 400.

Referring to FIGS. 11 and 12, a coil part 40-4 of the antenna module 400 includes an insulating substrate 41-4 having a through-hole 49 formed in a portion corresponding to the center region of the antenna wiring 43. The through-hole 49 penetrates through the insulating substrate 41-4.

In addition, the antenna module 400 includes a magnetic part 80-4 including a first magnetic part 80a-4 and a second magnetic part 80b-4. First and second magnetic flux connecting parts 82a-4 and 82b-4 of the first magnetic part 80a-4 and the second magnetic part 80b-4, respectively, include first and second inserting parts 83a and 83b, respectively, inserted into the through-hole 49.

Accordingly, the first inserting part 83a of the first magnetic part 80a-4 and the second inserting part 83b of the second magnetic part 80b-4 are coupled to each other while being in surface-contact with each other.

As such, in a case in which the first magnetic part 80a-4 and the second magnetic part 80b-4 are directly in contact with each other, the magnetic flux resistance is further decreased, thereby further increasing efficiency of the antenna module 400.

Although the embodiment of FIGS. 11 and 12 describes the case in which the first and second inserting parts 83a and 83b of the magnetic part 80-4 are inserted into the through-hole 49, by way of example, other configurations are possible. For example, a magnetic part having no insertion parts, as in the previous embodiments of FIGS. 1 to 4, FIGS. 5 to 7, and FIGS. 8 to 10, may also be used.

Figure 13:
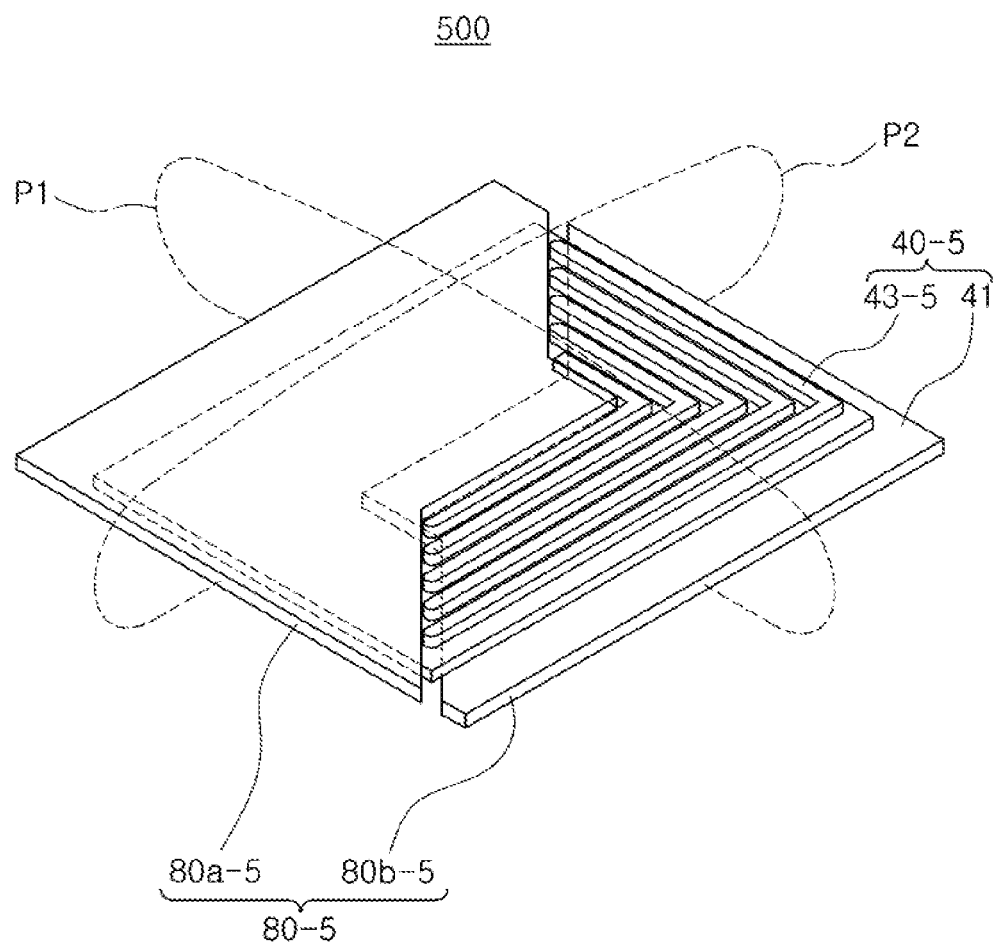
FIG. 13 is a perspective view schematically illustrating an antenna module, according to another embodiment.
Figure 14:
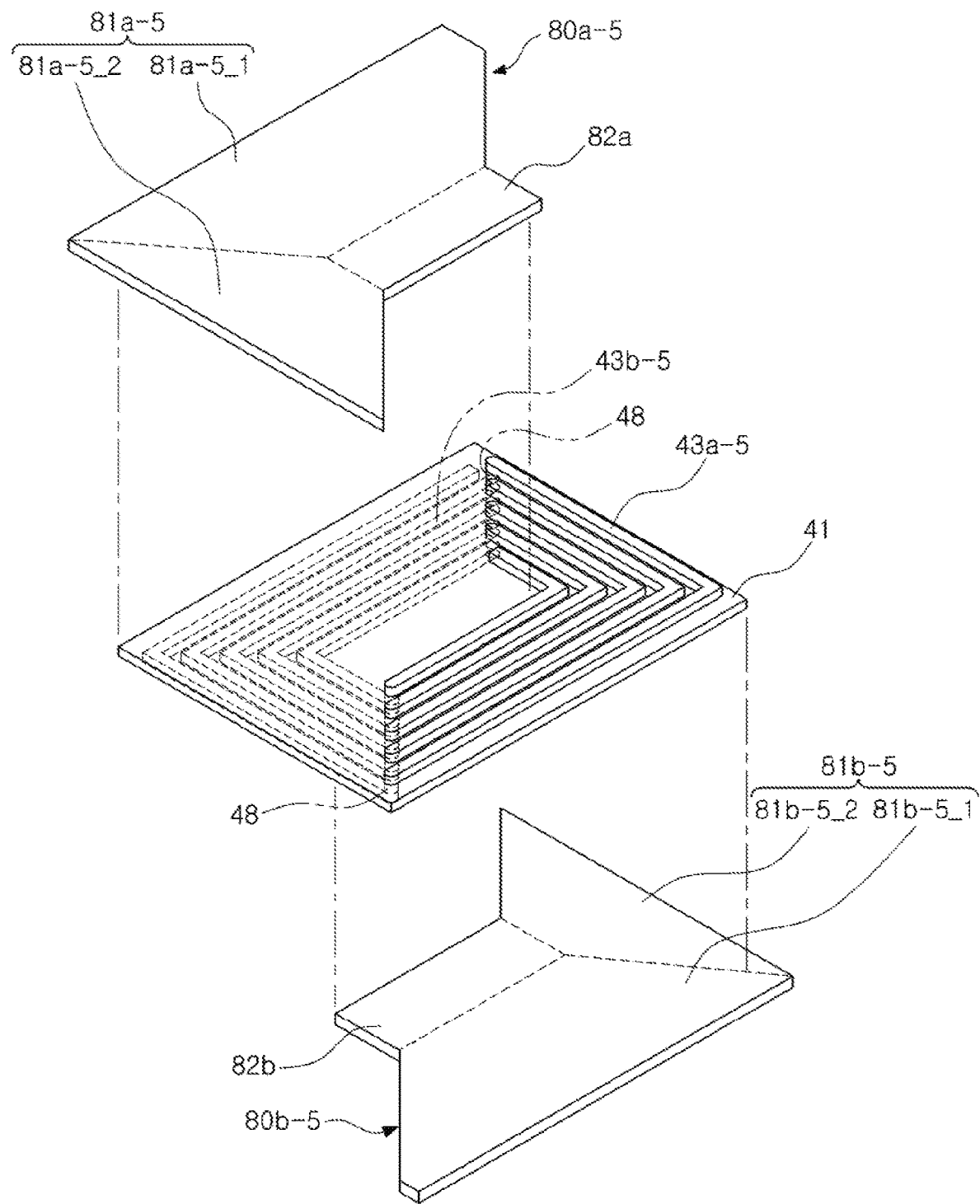
FIG. 14 is an exploded perspective view of the antenna module illustrated in FIG. 13.
Figure 15:
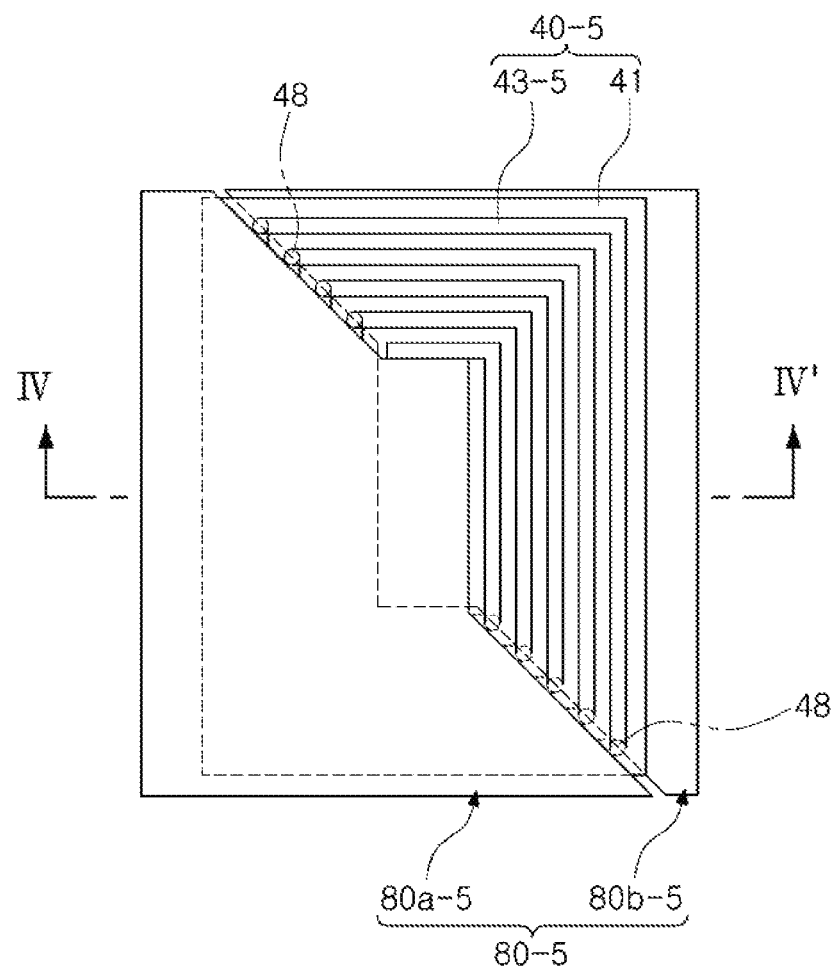
FIG. 15 is a plan view of the antenna module illustrated in FIG. 13.
Figure 16:
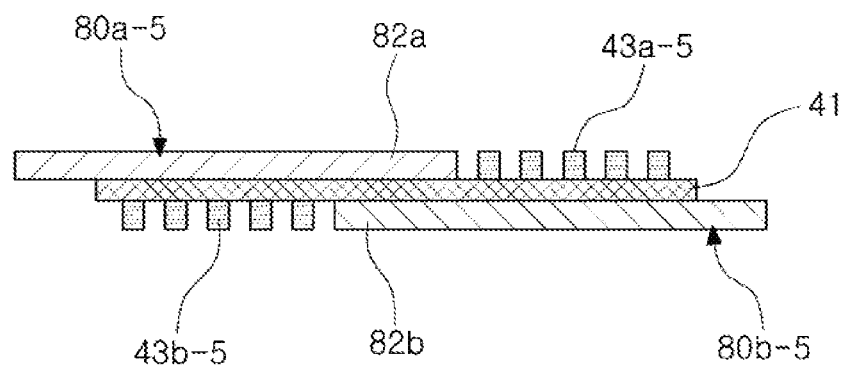
FIG. 16 is a cross-sectional view taken along line IV-IV' of FIG. 15.

FIG. 13 is a perspective view schematically illustrating an antenna module 500, according to another embodiment. FIG. 14 is an exploded perspective view of the antenna module 500. In addition, FIG. 15 is a plan view of the antenna module 500, and FIG. 16 is a cross-sectional view taken along line IV-IV' of FIG. 13.

Referring to FIGS. 13 through 16, an antenna module 500 differs from the embodiments described above in the position of the interlayer connecting conductors 48 formed on a coil part 40-5 of the antenna module 500, and the shape of a magnetic part 80-5 of the antenna module 500.

The coil part 40-5 includes an antenna wiring 43-5 formed in a quadrangular spiral shape, and the interlayer connecting conductor 48 is disposed in a corner portion in which the antenna wiring 43-5 is bent. Specifically, the interlayer connecting conductor 48 is disposed in corners positioned in a diagonal direction of the antenna wiring 43-5.

As a result, linear patterns of a first pattern 43*a*-5 of the antenna wiring 43-5 and linear patterns of a second pattern 43*b*-5 of the antenna wiring 43-5 all have a '¬' shape having one bend.

The magnetic part 80-5 has a shape corresponding to the first pattern 43*a*-5 and the second pattern 43*b*-5.

Specifically, a first magnetic part 80*a*-5 of the magnetic part 80-5 is disposed on the first surface of the insulating substrate 41, and is disposed on a region on which the first pattern 43*a*-5 is not formed, so as not to overlap the first pattern 43*a*-5. Similarly, a second magnetic part 80*b*-5 of the magnetic part 80-5 is disposed on the second surface of the insulating substrate 41, and is disposed on a region on which the second pattern 43*b*-5 is not formed, so as not to overlap the second pattern 43*b*-5.

In addition, the first magnetic part 80*a* and the second magnetic part 80*b* respectively have the first and second magnetic flux connecting parts 82*a* and 82*b* formed in the quadrangular shape corresponding to the center region of the antenna wiring 43-5. In addition, first and second body parts 81*a*-5 and 81*b*-5 of the body part 81-5 of the first magnetic part 80*a* and the magnetic part 80*b*, respectively, are radially expanded from two sides, which are continuously disposed, among four sides partitioning the first and second magnetic flux connecting parts 82*a* and 82*b*.

Specifically, the first and second magnetic flux connecting parts 82*a* and 82*b* have the quadrangular shape, and consequently, have the four sides. In addition, the first body part 81*a*-5 of the first magnetic part 80*a*-5 is divided into a first body part 81*a*-5_1 extended from a first side of the first magnetic flux connecting part 82*a*, and a second body part 81*a*-5_2 extended from a second side of the first magnetic flux connecting part 82*a*. Similarly, the second body part 81*b*-5 of the second magnetic part 80*b*-5 is divided into a first body portion 81*b*-5_1 extended from a first side of the second magnetic flux connecting part 82*b*, and a second body portion 81*b*-5_2 extended from a second side of the second magnetic flux connecting part 82*b*.

The second side is a side connected to the first side. Therefore, the first side may be perpendicular to the second side. The embodiment of FIGS. 13 to 16 is an example in which the first side is a long side and the second side is a short side, by way of example, but the first and second sides are limited to such a configuration.

In addition, the first body portions 81*a*-5_1 and 81*b*-5_1 and the second body portions 81*a*-5_2 and 81*b*-5_2 may all have a width that increases in a direction away from the first and second magnetic flux connecting parts 82*a* and 82*b*, respectively, and consequently, the first body portions 81*a*-5_1 and 81*b*-5_1 and the second body portions 81*a*-5_2 and 81*b*-5_1 may each have a trapezoidal shape or a shape similar thereto. Additionally, a section in which the above-mentioned width is increased may be limited to a region facing the antenna wiring 43-5.

In the configuration described above, the first magnetic part 80*a*-5 is stacked on the first surface of the coil part 40-5 to fully cover a region corresponding to two sides in the quadrangular shape formed by the antenna wiring 43-5, and the second magnetic part 80*b*-5 is stacked on the second surface of the coil part 40-5 to fully cover a region corresponding to the remaining two sides in the quadrangular shape formed by the antenna wiring 43-5.

Referring to FIG. 13, the magnetic field generated by the coil part 40-5 may be formed in a direction P1 and in a direction P2 that is perpendicular to P1.

Therefore, the direction in which the magnetic field is formed is expanded, and consequently, a recognition rate of the antenna module 500 is increased.

The embodiment of FIGS. 13 to 16 describes a case in which the antenna wiring 43-5 is formed in a rectangular shape as a whole, by way of example. However, the antenna wiring 43-5 is not limited to such a configuration. For example, the antenna wiring 43-5 may be formed in a square shape, a quadrangular shape with rounded corners, or a polygonal shape. Similarly to the embodiment described with respect to FIGS. 13 to 16, even in this case, the first magnetic part 80*a*-5 and the second magnetic part 80*b*-5 may be formed so that the body parts 81*a*-5 and 81*b*-5 are radially expanded from a half of the sides configuring a contour of the first and second magnetic connecting parts 82*a* and 82*b*.

In addition, the antenna wiring 43-5 may be formed in a circular shape or an oval shape. In this case, since the first and second magnetic connecting parts 82*a* and 82*b* may be formed in the circular or oval shape according to the shape of the center region of the antenna wiring 43-5, the first magnetic part 80*a*-5 and the second magnetic part 80*b*-5 may be formed so that the body parts 81*a*-5 and 81*b*-5 are expanded from a half of a circumference configuring the first and second magnetic connecting parts 82*a* and 82*b*.

Figure 17:
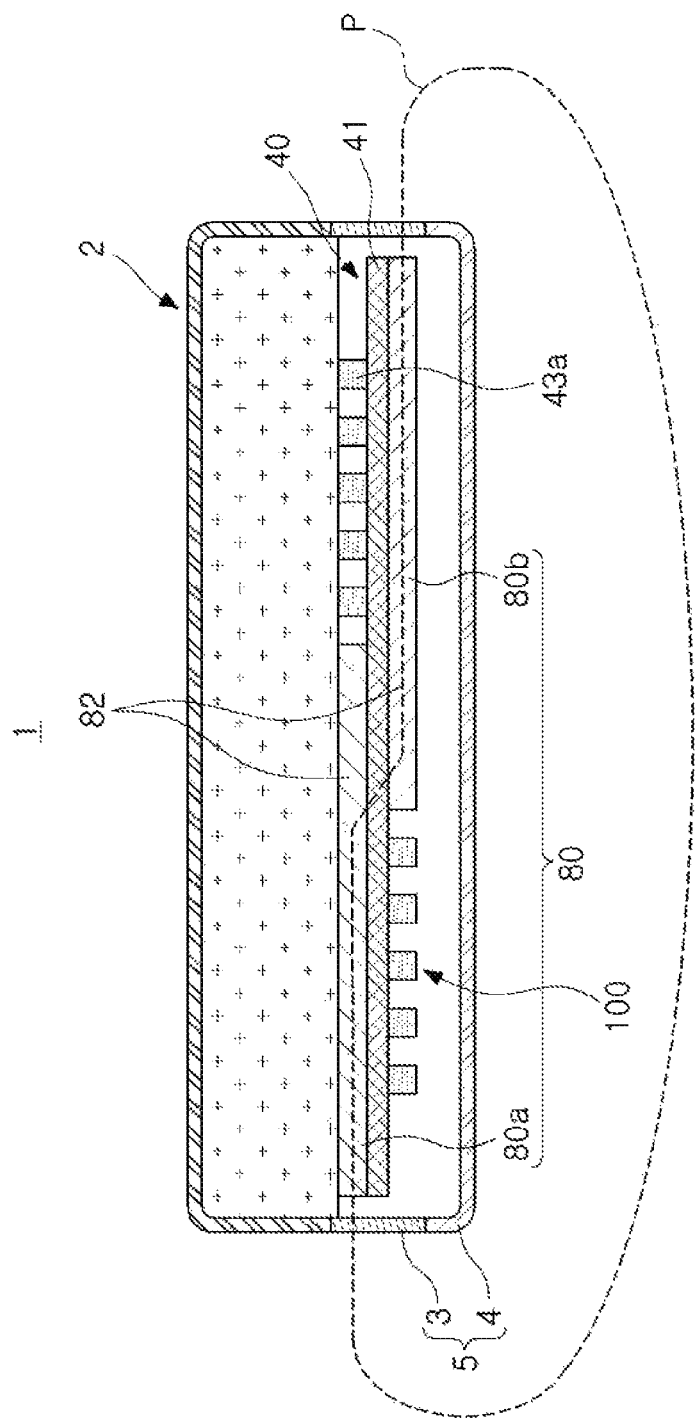
FIG. 17 is a cross-sectional view schematically illustrating an electronic device, according to an embodiment.

FIG. 17 is a cross-sectional view schematically illustrating an electronic device 1, according to an embodiment.

Referring to FIG. 17, the electronic device 1 is a portable terminal including the antenna module 100 (FIG. 1) described above, and performs short-range communications through the antenna module 100. Although the electronic device 1 is shown and described as including the antenna module 100, the electronic device may also include the antenna modules 200, 300, 400, or 500 described herein.

The electronic device 1 includes a terminal body 2, a case 5, and the antenna module 100.

The antenna module 100 is disposed in an internal space of the electronic device 1 formed by the terminal body 2 and the case 5.

The terminal body 2 includes various elements for driving the electronic device 1, such as a circuit board or a display.

The case 5 includes a side cover 3 and a rear cover 4. The side cover 3 may be formed of a non-metallic material (e.g., a resin material), and the rear cover 4 may be formed of a conductive material.

In addition, the first magnetic part 80*a* and the second magnetic part 80*b* have sides disposed to face the side cover 3.

Since a conventional antenna module radiates the magnetic field through the rear cover 4, the magnetic field may be blocked by the rear cover 4 when a rear cover 4 is formed of the conductive material. Therefore, it is difficult to smoothly communicate with a POS terminal (e.g., a magnetic reader).

However, in the antenna module 100, the magnetic field P is formed outside of the electronic device 1 through the side cover 3 as illustrated in FIG. 17, by the first magnetic part 80*a* and the second magnetic part 80*b*.

Therefore, even in a case in which the rear cover 4 of the electronic device 1 is formed of a metal material, short-range communications can be smoothly performed.

The electronic device 1 may be a cellular phone. However, the electronic device 1 is not limited to being a cellular phone, and may be any electronic device that can be carried and can perform wireless communications, such as a notebook PC, a tablet PC, or a wearable device such as a smartwatch.

As set forth above, according to the embodiments disclosed herein, an antenna module provides a magnetic path that significantly reduces magnetic flux resistance through a magnetic flux connecting part of a first magnetic part and a second magnetic part. Therefore, the efficiency of the antenna module is significantly increased.

In addition, since the antenna module may be manufactured by an operation of stacking the coil part and the magnetic part, the antenna module can be very easily manufactured.

In addition, an electronic device according to an embodiment disclosed herein can smoothly perform short-range communications, even if a rear surface case is formed of a metal material.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module, comprising:
    a coil part comprising an insulating substrate and an antenna wiring on the insulating substrate;
    a first magnetic part on a first surface of the insulating substrate; and
    a second magnetic part on a second surface of the insulating substrate,
    wherein the first magnetic part and the second magnetic part overlap with each other on a center region of the antenna wiring;
    wherein the antenna wiring has a quadrangular spiral shape;
    wherein the antenna wiring includes,
        a first pattern on the first surface of the insulating substrate in a first region corresponding to two sides in the quadrangular spiral shape,
        a second pattern on the second surface of the insulating substrate in a second region corresponding to remaining two sides in the quadrangular spiral shape, and
        an interlayer connecting conductors in the insulating substrate and connecting the first pattern and the second pattern to each other;
    wherein the second magnetic part covers the first region; and
    wherein the first magnetic part covers the second region.

2. The antenna module of claim 1, wherein
    the first pattern comprises first linear patterns exposed to an exterior of the first magnetic part and disposed in parallel, and
    the second pattern comprises second linear patterns exposed to the exterior of the second magnetic part and disposed in parallel.

3. The antenna module of claim 1, wherein
    the first magnetic part and the second pattern face each other with the insulating substrate therebetween, and
    the second magnetic part and the first pattern face each other with the insulating substrate therebetween.

4. The antenna module of claim 1, wherein a region of the insulating substrate on which the first magnetic part is disposed and a region of the insulating substrate on which the second magnetic part is disposed are separated by the interlayer connecting conductors and the center region.

5. The antenna module of claim 1, wherein
    the first magnetic part comprises a first magnetic flux connecting part in the center region, and a first body part extended from the first magnetic flux connecting part and facing the second pattern, and
    the second magnetic part comprises a second magnetic flux connecting part in the center region, and a second body part extended from the second magnetic flux connecting part and facing the first pattern.

6. The antenna module of claim 5, wherein an area of the second body part is greater than an area of the first body part.

7. The antenna module of claim 5, wherein
    the interlayer connecting conductors are at corners at which the antenna wiring is bent.

8. The antenna module of claim 7, wherein
    the first magnetic flux connecting part and the second magnetic flux connecting part each are in quadrangular shape,
    the first body part comprises a first body portion extended from a first side of the first magnetic flux connecting part, and a second body portion extended from a second side of the first magnetic flux connecting part connected to the first side of the first magnetic flux connecting part, and
    the second body part comprises a third body portion extended from a first side of the second magnetic flux connecting part, and a fourth body portion extended from a second side of the second magnetic flux connecting part connected to the first side of the second magnetic flux connecting part.

9. The antenna module of claim 1, wherein the first magnetic part or the second magnetic part has a thickness that is the same as a thickness of the antenna wiring.

10. The antenna module of claim 1, further comprising:
    a third magnetic part on the first surface of the insulating substrate,
    wherein the antenna wiring comprises a first antenna wiring and a second antenna wiring spaced apart from each other,
    wherein the first antenna wiring is between the first magnetic part and the second magnetic part, and
    wherein the second antenna wiring is is between the third magnetic part and the second magnetic part.

11. The antenna module of claim 10, wherein the second magnetic part comprises a first side overlapping the first magnetic part, and a second side overlapping the third magnetic part.

12. The antenna module of claim 1, wherein
    the insulating substrate includes a through-hole in the center region, and the first magnetic part and the second magnetic part each include an inserting part inserted into the through-hole.

13. An electronic device, comprising:
    an antenna module including, a coil part comprising an insulating substrate and an antenna wiring on the insulating substrate, a first magnetic part on a first surface of the coil part, and a second magnetic part on a second surface of the coil part and overlaying the first magnetic part in a center region of the antenna wiring; and a case accommodating the antenna module, wherein the case comprises a rear cover formed of a metal material and a side cover formed of a non-metal material, wherein the antenna wiring has a quadrangular spiral shape;

wherein the antenna wiring includes, a first pattern on the first surface of the insulating substrate in a first region corresponding to two sides in the quadrangular spiral shape, a second pattern on the second surface of the insulating substrate in a second region corresponding to remaining two sides in the quadrangular spiral shape, and an interlayer connecting conductors in the insulating substrate and connecting the first pattern and the second pattern to each other;

wherein the second magnetic part fully covers the first region; and wherein the first magnetic part fully covers the second region.

14. The electronic device of claim 13, wherein the first magnetic part and the second magnetic part comprise sides facing the side cover.

15. The electronic device of claim 13, wherein the second magnetic part overlays the first magnetic part only in the center region.

16. The electronic device of claim 13, wherein the electronic device comprises any one of a cellular phone, a tablet PC, a notebook PC, and a smartwatch.

17. The electronic device of claim 13, wherein the antenna module is configured to form a magnetic field outside of the electronic device through the side cover.

* * * * *